DATA STEERING CIRCUIT

Filed May 15, 1969 5 Sheets-Sheet 1

INVENTORS: J. J. COLLINS
R. D. HUTCHINSON
C. T. KEYS
W. L. WILHOYTE
BY Donald M Duft
ATTORNEY

DATA STEERING CIRCUIT

Filed May 15, 1969 5 Sheets-Sheet 2

Feb. 2, 1971 J. J. COLLINS ET AL 3,560,938

DATA STEERING CIRCUIT

Filed May 15, 1969 5 Sheets-Sheet 3

United States Patent Office 3,560,938
Patented Feb. 2, 1971

3,560,938
DATA STEERING CIRCUIT

John J. Collins, Richard D. Hutchinson, Charles T. Keys, and Winard L. Wilhoyte, Columbus, Ohio, assignors to Bell Telephone Laboratories, Incorporated, Murray Hill, N.J., a corporation of New York Filed May 15, 1969, Ser. No. 824,785
Int. Cl. G11c *9/00*
U.S. Cl. 340—172.5 21 Claims

ABSTRACT OF THE DISCLOSURE

The invention comprises a steering and distribution circuit which permits data to be transferred over a plurality of busses from registers to an electronic type data receiving circuit, such as a tape recorder, at a relatively high rate via the contacts of steering relays associated with each bus. The improvements reside in (1) circuitry for operating the steering relays of each bus prior to the time that data is to be applied via the contacts of an operated relay to the recorder, and (2) circuitry in both the register and the recorder which provides an indication that all of the registered data has been transferred to the recorder.

BACKGROUND OF THE INVENTION

Figure 1A:
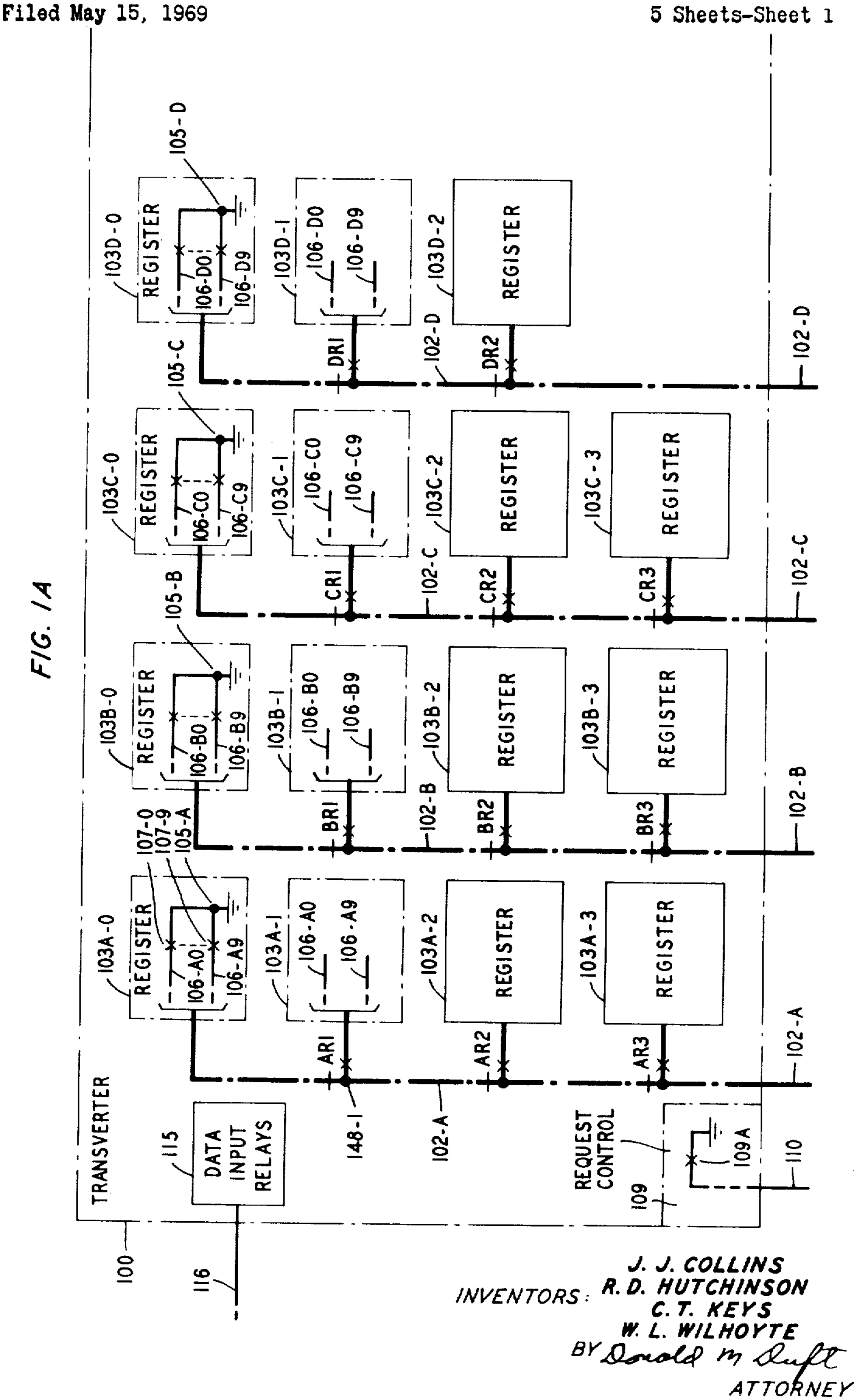

This invention relates to a data steering and control circuit and, in particular, to a relay steering circuit which facilitates the rapid and efficient transfer of data from a storage device to a utilization circuit. The invention further relates to a steering circuit which permits data to be transferred out of a storage device at higher rates than as heretofore been possible with relay circuitry. The invention still further relates to a steering circuit which may transmit data blocks of varying sizes to a utilization circuit and which, in so doing, utilizes an effective and uncomplicated expedient for informing the utilization circuit when all of the data in a block has been transmitted.

It is often desirable in telephone and other such systems to transfer large quantities of data between the various circuits or portions of the system. Although it is rarely economically feasible, the transfer could obviously be made by providing an individual interconnecting conductor for each data bit that is to be transferred. More typically, a plurality of busses are used in conjunction with a multiposition steering circuit for each bus so that the data that is to be transferred may be extracted from the circuit in which it is stored and applied to the busses sequentially in a byte-by-byte manner. Each byte contains a number of data bits corresponding to the number of conductors in each bus. The receiving circuit may also contain a steering circuit for distributing the received data to appropriate registers or the like within it. The advancement of the steering circuits at the transmitting end of the busses is usually controlled by the receiving end ciruitry which does not initiate the advancement until it has determined that all data bytes currently on the busses have been satisfactorily received and registered.

This method of transferring data is reasonably satisfactory in instances in which both circuits involved in the transfer are of the electromechanical type, since both circuits are essentially equal insofar as concerns the rate at which they are capable of transmitting and receiving data. However, problems may occur in instances in which the data receiving circuit is of the electronic type, such as a tape recorder, while the circuit from which the data is to be transferred is of the relay type. The reason for this is that the electronic circuitry cannot operate at its normal speed and instead is periodically required to pause and wait for the steering relays at the transmitting end of the busses to operate and advance the operative position of the steering circuits. This problem occurs or at least is aggravated by the fact no action is taken to advance the steering circuits at the transmitting end until a signal is received back indicating that the data bytes currently on the busses have been successfully registered, or alternatively, until a predetermined time has elapsed which in itself assures a successful registration. The situation is further aggravated by the fact that the receiving circuitry must not only wait for the steering relays to operate, but it must also wait an additional time thereafter for the contacts of the steering relays to stabilize so that erroneous data will not be generated by contact bounce.

In many systems, data is not exchanged or transmitted in blocks containing a fixed number of data bits but rather, may often be transmitted in blocks of varying sizes. In complicated and expensive systems, it is relatively easy to determine the end of the transmission of each block since such expedients as a "beginning of data" and "end of data" signals may be used to mark the beginning and termination of each transmission. However, in systems of lesser complexity, this is not possible due to its inherent cost. A less expensive, but reliable, expedient for determining the end of a data transmission is therefore a necessity.

BRIEF SUMMARY OF THE INVENTION

It is an object of the present invention to provide a steering and control circuit which permits data to be transferred at higher rates than has heretofore been possible over contacts of a relay type steering circuit from a data storage circuit to an electronic type utilization circuit such as a tape recorder.

A further object is to provide an economical arrangement for indicating when all of the data currently in the storage device has been applied via the steering circuit to a data bus for transfer to a utilization circuit, such as a tape recorder.

In accordance with our invention, we provide a data steering and distribution circuit which includes (1) a plurality of data busses interconnecting the two circuits between which the data is to be transferred, (2) a relay type steering circuit individual to each bus in the circuit from which the data is to be transferred, (3) facilities in the recorder input circuitry for repeatedly scanning the data on each bus sequentially bus-by-bus, and (4) a control circuit in the recorder for initiating the advancement of the steering circuit of each bus as soon as the data byte on the bus is scanned. During the time the steering relays of a bus are in the process of operating to advance the steering circuit to its next position, the recorder scans the data bytes on the remaining busses. Subsequently, when the recorder returns to the bus to receive the next data byte from it, the recorder is not required to wait for the steering relays to operate since the steering circuit is already in the position required to apply the next data byte to its bus. Problems of contact bounce are also eliminated by this expedient and the next data byte on the bus may therefore be immediately scanned by the recorder.

In order to clarify an understanding of our invention, let it be assumed that (1) four data busses interconnect the two circuits between which the data is to be transferred, (2) each data bus is connected to a four position steering circuit in the circuit in which the data is stored prior to its transfer, (3) the recorder scans the four busses sequentially and repetitively until all of the currently available data has been transferred, and (4) four control conductors, each of which is individual to a different one of the data busses, also interconnect the two circuits. Signals are applied to each control conductor by the recorder to advance the steering circuit of the bus associated with the conductor as soon as the data byte currently on the bus is scanned.

The recorder scans and receives the data byte currently on the first bus at the beginning of a data transfer operation. Each steering circuit is in its normal or first position at this time and, therefore, the initial scanning of the first bus constitutes a transfer to the recorder of the data byte currently applied to the bus by the circuit in which the data is stored. As soon as the first bus is scanned, the recorder applies a signal to the control conductor of the bus to initiate the advancement of its steering circuit. This advancement does not occur instantaneously and instead, it takes place while the recorder scans the remaining busses. In the same manner as for the first bus, the recorder scans the remaining busses in sequence and applies a signal to initiate the advancement of the steering circuit of each such bus at the same time the bus is scanned. Subsequently, when the recorder returns for a second scan of the first bus, the steering circuit of the bus has completed its advancement from its first to its second position so that a new data byte is immediately available. The recorder therefore is not required to wait for the steering relays to operate when it returns to read the next data byte from the bus.

Further in accordance with our invention, each steering circuit is arranged so that it applies a special signal to the control conductor of its bus when the bus has received the last data byte currently available to it within the transmitting end circuit. This signal is detected by the recorder control circuit and, by means of special logic circuitry, the control circuit determines when this signal has been received over all four control conductors. This condition indicates that all data currently stored in the transmitting end circuit has been scanned and received by the recorder, At this time, the recorder releases its connection with the transmitting end circuit and makes itself available for the recording of data from other circuits.

A feature of our invention is the provision of a relay steering circuit in which the relays are operated prior to the time that data is to be applied over the relay contacts to a utilization circuit such as a tape recorder.

A further feature comprises a data transfer system having a plurality of data busses, a steering circuit individual to each bus, apparatus for scanning the data busses sequentially bus-by-bus, apparatus for advancing the steering circuit associated with each bus during the time the remaining busses are being scanned so that when a bus is subsequently rescanned, its steering circuit is already in the position required to make the next data byte immediately available to the scanning circuitry.

A further feature comprises apparatus for applying an end of data signal to a steering control conductor individual to each bus as an indication that all of the registered data associtaed with the bus within the transmitting end circuit has been made available to the scanning equipment.

A further feature comprises logic circuitry connected to the control conductors to determine when the end of data signal has been received over all conductors in order to generate an indication that all of the currently registered data in the transmitting end circuit has been received.

Figure 1B:
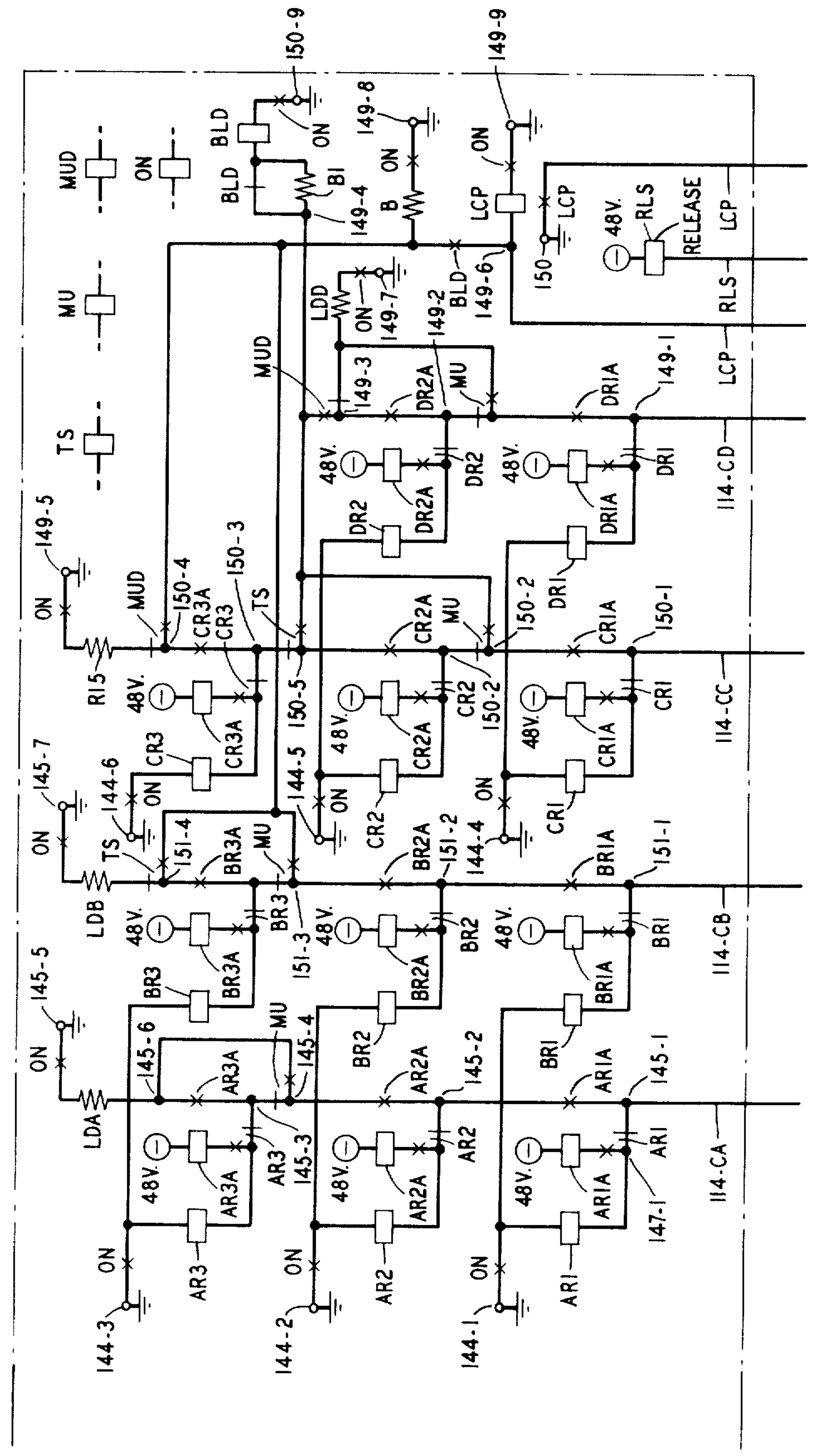
Figure 1C:
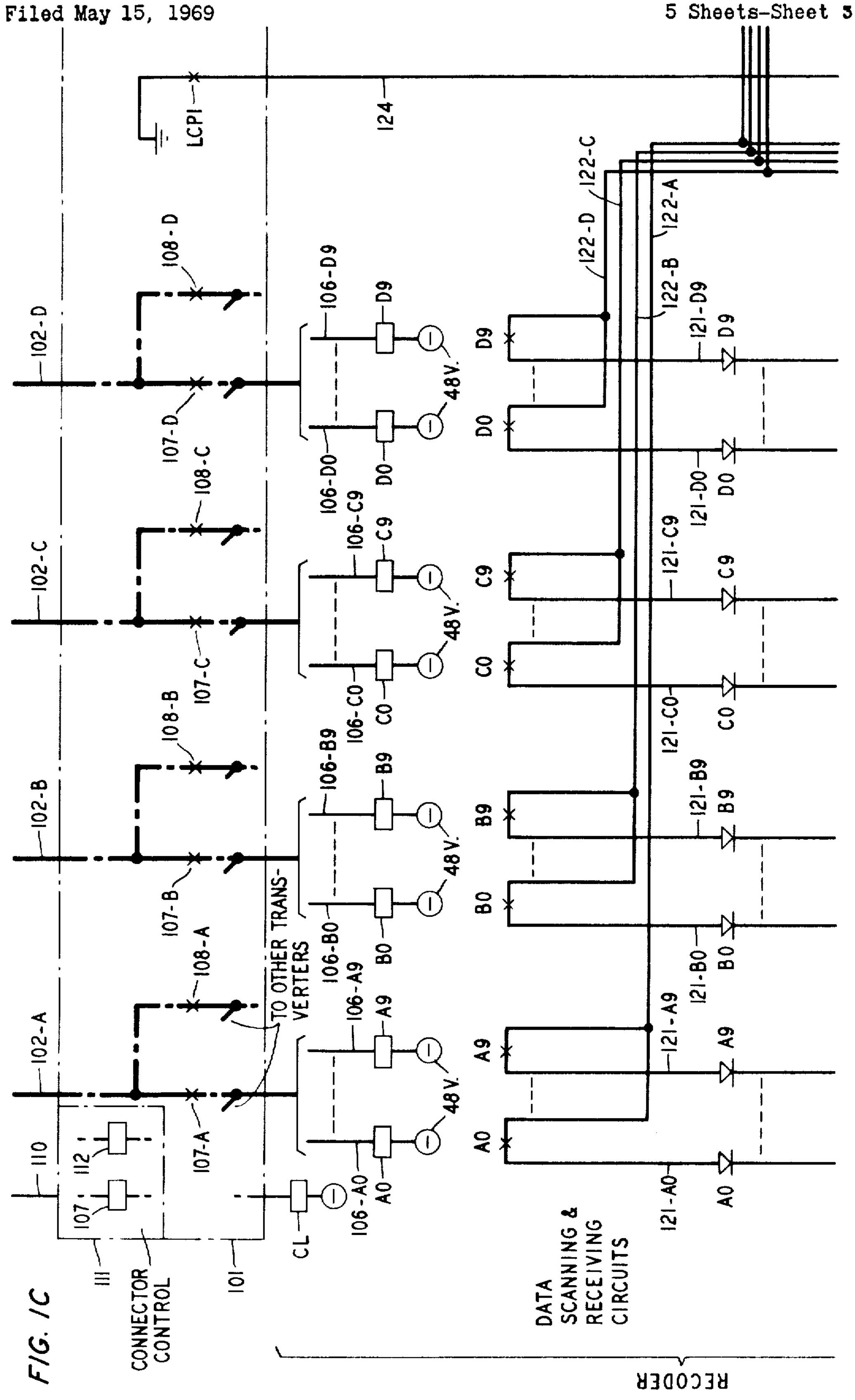
Figure 1D:
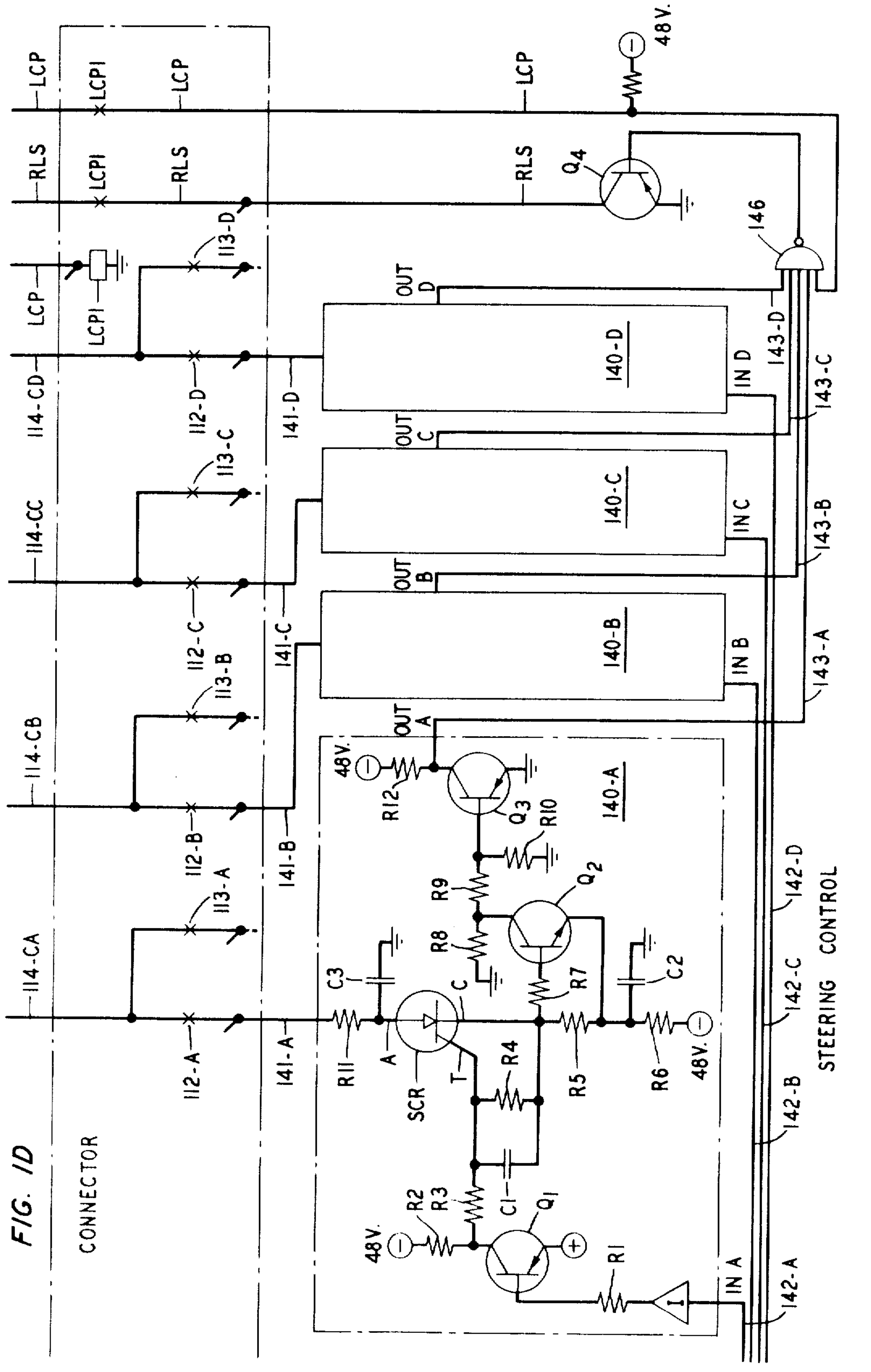
Figures 1E, 2:
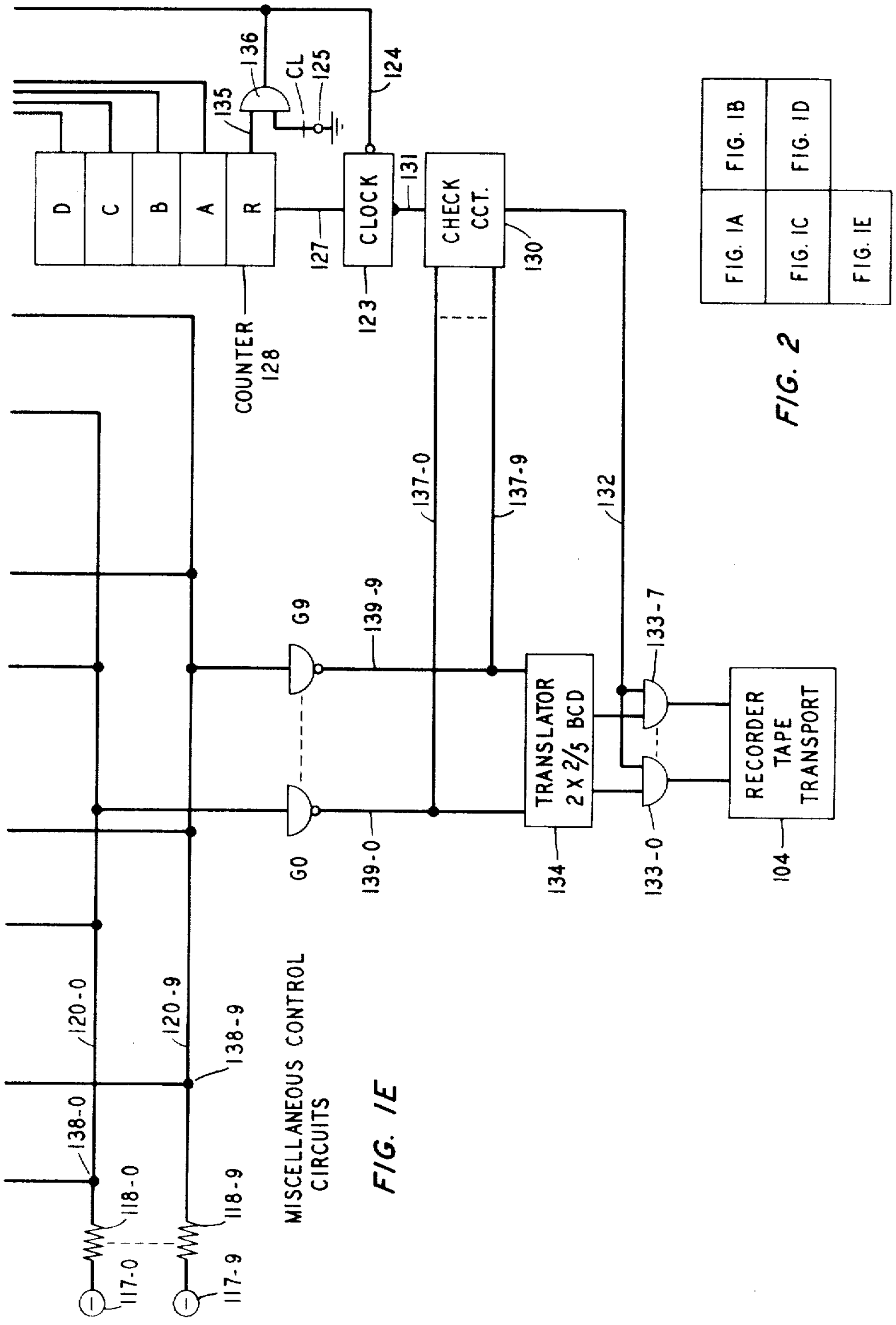

These and other objects and features of the invention will become apparent upon a reading of the following description of the invention taken in conjunction with the drawing in which FIGS. 1A through 1E, when arranged as shown in FIG. 2, illustrates the details of a circuit embodying our invention.

DETAILED DESCRIPTION

The invention is shown on FIGS. 1A through 1E as being embodied in a telephone system having call data recording facilities. The data that is to be recorded is initially stored in a transverter 100 shown on FIGS. 1A and 1B. When a recording operation is to take place, the data is transferred from the transverter over, busses 102–A through 102–D, through the connector 101 shown on the top of FIGS. 1C and 1D, to the recorder and its control circuitry which is shown on FIGS. 1C, 1D, and 1E. The transferred data is ultimately recorded on tape by the transport 104 shown on the bottom of FIG. 1E.

The transverter may be functionally divided into the plurality of registers shown on FIG. 1A and a steering circuit which is shown on FIG. 1B. The recorder may be functionally divided into the data scanning and receiving circuitry of FIG. 1C, the steering control circuitry of FIG. 1D and the miscellaneous control circuits of FIG. 1E.

In the commercial use of systems embodying our invention, a plurality of transverters are provided for recording data for the various calls served by the system. Each transverter is connected to the connector 101 and, by means of it, has access to two recorders. Two recorders are provided for purposes of reliability, but only a single recorder is used at a time. The present drawing discloses only a single transverter, a single connector and a single recorder in order to simplify an understanding of the invention. However, the drawing illustrates how any transverter may be connected to any recorder. Thus, the four data busses 102–A through 102–D extending from transverter 100 may be connected to the recorder circuitry of FIG. 1C by means of contacts 107–A through 107–D. Similarly, the four data busses may be connected to the other recorder (not shown) by means of contacts 108–A through 108–D. The multiple marks immediately below the make contacts in the connector indicate that each recorder may be connected to other transverters by means of contacts similar to those specifically shown for transverter 100. In a similar manner, the four control conductors 114–CA through 114–CD extending to the transverter steering circuit on FIG. 1B may be connected via make contacts 112–A through 112–D to the recorder circuitry of FIG. 1D, and by means of make contacts 113–A through 113–D to the other recorder. The multiple marks below these make contacts functionally represent the circuit paths extending to other transverters whose details are not shown.

Although the transverter is a complex circuit, it is sufficient for an understanding of the present invention to pursue a discussion of the transverter only to the point of stating that its services are required on each call for which data is to be recorded. During the course of its operation, the transverter is seized by and receives call data from other circuits of the telephone system of which it is a part. The transverter temporarily stores the data it receives and shortly thereafter, it obtains a connection to a recorder and then transfers the call data it has received to the recorder where the data is placed on magnetic tape. The data received by the transverter is temporarily stored in the registers on FIG. 1A. These registers are shown as being arranged into rows and columns with the left-most column of registers being designated 103A–0 through 103A–3 and with the right-most column being designated 103D–0 through 103D–2. The top row registers are designated 103A–0 through 103D–0. The bottom row designations are 103A–3 through 103C–3. Hereinafter, for convenience of discussion, the various rows of registers will be referred to as the top, second, third and fourth respectively, with the fourth row also being the bottom row. The various columns will be referred as the A, B, C, and D columns, starting with the left-most column. Where it is necessary to distinguish a particular register from the other registers of its row or column, the drawing designation of the register will be used, i.e., register 103A–0 for the upper left-most register on FIG. 1A.

Each register receives information in 2-out-of-5 code form and each register has the capacity to store two information characters. Thus, with reference to register 103A–0, it contains ten make contacts 107–0 through 107–9, and these ten contacts are selectively operated under control of the received information to represent two characters in 2-out-of-5 code form. The ten make contacts 107–0 through 107–9 may be functionally divided into two groups of five each, i.e., 107–0 through 107–4 and 107–5 through 107–9. Upon the reception of call data by the transverter, two make contacts in each group are operated to extend the terminal 105–A ground, via break contacts AR1, to the four conductors in cable 102–A that are then connected to the operated contacts. The grounds on these conductors are further extended through the connector contacts 107–A to the recorder to operate four of its register relays in the group A0 to A9. This effectively transfers the data stored in the register to the recorder.

The relay windings that control the operation of the transverter register contacts are not shown in detail since they comprise no portion of our invention. All that need be understood is that there is an individual relay for each make contact within each transverter register of FIG. 1A. These relays may be termed the transverter data input relays, and they are operated in combinational code form by the circuits of the system that transmit the call data to the transverter. On FIG. 1A these relays are diagrammatically represented by the rectangle 115 and the input signals that operate these relays are received by the transverter over bus 116.

The transverter can receive data pertaining to different types of calls and, in turn, transmit to the recorder different quantities of data. The only thing that need be considered regarding this aspect of the transverter's operation is that the blocks of data that are to be transferred by it to the recorder vary in size, i.e., the quantity of data contained in the block. The present disclosure embodies provisions for transmitting three different sizes of data blocks. The largest data block uses all fifteen registers in the transverter; it contains thirty characters in 2-out-of-5 code form; and the type of entry produced by the recorder upon the receipt of a data block of this size is referred to as an MUD (message unit detail) entry. The transverter may also store a data block that utilizes only the first fourteen of its fifteen registers. This data block contains twenty-eight characters in 2-out-of-5 code form; and the type of entry produced by the recorder upon the receipt of this block is referred to as a TS (toll statement) entry. The transverter may also store a data block that utilizes only the first ten of its registers, namely the eight registers comprising the two top rows together with the left-most two registers of the third row. This block contains twenty characters in 2-out-of-5 code form and upon its receipt, the recorder produces what is known as an MU (message unit) entry.

The transverter is advised as to the type of call entry on each usage by the operation of one of its relays TS, MU, or MUD as shown in the upper right-hand corner of FIG. 1B. The circuit that seizes the transverter operates one of these relays to indicate the type of call entry that is to be produced. The circuit paths of these relays are shown only diagrammatically since their details comprise no portion of the present invention.

The following first describes the operation of the steering circuit for a call entry in which all transverter registers are used, namely, an entry of the MUD type. Following that, the differences in circuit operation for the other two types of entries are then described.

In order to describe the operation of the invention in further detail, let it be assumed that transverter 100 has been seized on a call usage, that other circuits of the systems have transmitted to the transverter the call data that is to be recorded, and since the received data represents a MUD entry that all fifteen transverter registers of FIG. 1A contain two data characters each in 2-out-of-5 code form. This data is received by the transverter over cable 116 and registered in its data input relays 115 as already described. Subsequently, when the data is to be transferred to a recorder, the transverter initiates the establishment of a connection to the particular recorder that is currently active in recording the call data generated by the system. This operation is described in the following paragraphs where it is assumed that recorder 104 together with its control circuitry on FIGS. 1C, 1D, and 1E is currently the active recorder.

The transverter effects an interconnection between itself and the recorder by causing a ground to be extended from its "request control" circuit 109 on FIG. 1A, through the make contact 109A, over conductor 110 to the connector control circuit 111. The function of this circuit is to recognize the receipt of service requests from bidding transverters and to honor these requests in an ordered manner so that only one transverter at a time obtains a connection to a recorder.

Let it be assumed at this time that there are no other bidding transverters, that connector 101 responds to the service request from transverter 100, and that it interconnects the transverter with the recorder of FIGS. 1C, 1D and 1E. This connection is affected within the connector by the closure of contacts 107–A through 107–D on FIG. 1C and by the closure of make contacts 112–A through 112–D on FIG. 1D. Make contacts 107–A through 107–D are closed upon the energization of the relay winding 107 and contacts 112–A through 112–D are operated under control of the relay winding 112. The details of the circuitry that controls the operation of these relays are shown diagrammatically within connector control circuit and they operate in response to the receipt of a service request from transverter 100.

Each of the four data busses 102–A through 102–D contains ten conductors. When the transverter is connected to the recorder, the ten conductors in each bus are individually connected to the windings of recorder relays which operate and register the data received from the transverter. Thus, the ten conductors of bus 102–A are individually connected to relays A0 through A9 via conductors 106–A0 through 106–A9. Relays A0 through A9 operate to receive each data byte applied to bus 102–A. In a similar manner, the ten conductors of the remaining three data bussess are connected to the windings of the 106–B, C–, and D– groups of relays. Each transverter register, and the ten make contacts within it, is connectable by the contacts of the steering relays one register at a time, to the ten conductors of the bus serving the column in which the register is situated. Thus the ten conductors of data bus 102–A (106–A0 through 106–A9) may be connected under control of steering relay contacts AR1, AR2, and AR3 to the left-most column of registers, one register at a time. In a similar manner, the conductors of bus 102–B may be connected by the steering relay contacts BR1, BR2, and BR3 to the second column of registers, namely registers 103B–0 through 103B–3. The conductors of the data busses 102–C and the 102–D are connected by steering relay contacts to the third and fourth column of registers.

The controlling windings for the steering relay contacts on FIG. 1A are shown on FIG. 1B. Contacts AR1 through AR3 , serving the left-most column of registers on FIG. 1A, are controlled by the relay windings AR1 through AR3 which comprise the left-most column of relays on FIG. 1B. The windings for steering relay contacts of the second, third and fourth column of registers in FIG. 1A are shown in the second, third and fourth column of relays on FIG. 1B.

All steering circuit relay windings are in a normal or released state during the idle condition of the transverter as well as during a brief period of time subsequent to the connection of the transverter to the recorder. With all steering relays released, the conductors of each data bus are connected via the break contacts of the steering relays to the top-most transverter register of its column The conductors of bus 102–A are connected through break contacts AR3, AR2, and AR1 to register 103A–0 and, in turn, to its ten make contacts 107–0 through 107–9. The ten conductors of data busses 102–B, 102–C, and 102–D are connected via the break contacts of the relays of their steering circuits to the top registers in the second, third, and fourth column of registers, respectively.

The data applied to the busses by the transverter is received by the four groups of ten relays each on FIG. 1C which are designated A0 through D9. Each group is individual to a different data bus and each relay within a group is connected to an individual conductor of its bus. When the data is received in 2-out-of-5 code from the transverter, the recorder relays connected to each bus operates in a similar 2-out-of-5 code manner to temporarily store the received data. For example, when two data characters are transmitted over bus 102–A to the recorder, four of the ten relays A0–A9 are operated. In a similar manner four each from the ten B–, the ten C–, and ten D– relays are operated to receive the data applied to their respective busses. The A–, B–, C–, and D– relays may be referred to as the recorder input relays.

It is described in the subsequent paragraphs how the data represented by the operated recorder input relays is scanned or read sequentially group-by-group, how the two data characters stored within each group are translated and recorded on a single line of tape, how the advancement of the steering circuit for each bus is initiated when the data on the bus is read, and how this sequence of operations is repeated a number of times until all of the data contained within the transverter is received and recorded.

The data reading or scanning operation is controlled by clock 123 which generates output pulses whenever its input conductor 124 is not inhibited by a ground potential. In the normal or idle position of the recorder circuit, the clock is inhibited by a ground potential from the output of the noninverting AND gate 136. The AND gate supplies the inhibiting ground on its output to the clock whenever both of its inputs are grounded. One input of the AND gate is connected through the break contacts of relay CL to ground at terminal 125. Relay CL, whose winding is shown on the upper left portion of FIG. 1C, is operated whenever the recorder is seized by the connector under control of a bidding transverter. At this time, the break contacts of the CL relay open and remove ground from the lower input of AND gate 136. This removes the ground from the output of the gate and permits the clock to operate and generate pulses at a predetermined frequency. These pulses are applied to its output conductor 127 extending to counter 128. The counter has a reset (R) position and four counting positions designated A, B, C, and D. The counter remains in its R position during the idle condition of the recorder and at that time, a ground is extended over output conductor 135 from the R section of the counter to the upper input of AND gate 136. This ground together with the ground from the break contacts of relay CL maintain the clock in an inhibited state and the counter in its R position.

Contacts CL open when the recorder is seized, the AND condition of gate 136 is destroyed, the clock begins to generate output signals as the inhibit potential is removed from its input, and the counter responds to the clock output pulses and advances its operative one step for each pulse received. In response to the reception of the first pulse following the seizure of the recorder, the counter advances from its R to its A position and, as further pulses are received, it advances to its B, C, and D positions. The counter is of the ring type and thus, as still further pulses are received, it advances from its D back to its R and then continues to advance one position for each pulse received in a similar manner to that already described.

The output conductors of the counter are normally at a negative potential whenever the counter is not in the operative position associated with each conductor. When the counter advances to a position associated with a particular conductor, the counter grounds the conductor during the time it remains in the position associated with the conductor. Thus, the output conductors 135 and 122–A through 122–D are grounded sequentially and repeatedly by the counter as long as relay CL remains operated under control of the connector 101. The grounding of output conductor R does not affect the state of gate 135 as long as relay CL remains operated.

The output conductors 122–A through 122–D extend to the make contacts of the ten input relays connected with each data bus. Conductor 122–A is connected to the ten make contacts A0 through A9, and the output conductors of the B, C, and D sections of the counter are connected to the B–, C–, and D– sets of contacts, respectively.

It has already been mentioned that the counter steps to its position A shortly after the transverter is initially connected to the recorder. It has also been mentioned that four each of the A–, B–, and D–, input relays of the recorder are operated by the received data to represent two characters per group in 2-out-of-5 code form.

The ground on conductor 122–A from the A section of the counter is extended through the four closed ones of make contacts A0 through A9, extended through the corresponding diodes A0 through A9 to terminals 138–0 through 138–9. Only the four terminals that are connected, via the diodes, to the four operated contacts are grounded at this time; the terminals associated with the unoperated ones of contacts A0 through A9 are ungrounded and remain at a negative potential through the associated resistors 118–0 through 118–9. The ground on the four terminals is further extended, via the associated conductors 120–0 through 120–9, to the input of the gates G0 through G9. These gates are of the inverting type as indicated by the small circle at their outputs and therefore, the four of these gates that currently have a ground applied to their input extend a high negative potential from their output over four of the conductors 139–0 through 139–9 to the input of translator 134. These grounds are also extended over four of conductors 137– to check circuit 130.

The function of the check circuit is to determine that the data on the output of gates G0 through G9 is in the proper 2-out-of-5 code form. This function is accomplished by determining that two gate output conductors for each subgroup of five currently are at a high negative potential while the remaining three conductors in each subgroup are at a ground potential. In the event the plausibility of the data checks good, the check circuit applies an enabling potential to conductor 132 which extends to one input of each of AND gates 133–0 through 133–7. The other input of each of these AND gates is connected to the output of translator 134 which translates the 2-out-of-5 type information it receives into binary coded decimal (BCD) form. This BCD information is applied as a pattern of binary "1's" and "0's" to the left-hand input of gates 133–0 through 133–7. The AND gates to which a binary "1" is applied by the translator turn on and apply a corresponding binary "1" from their output to the appropriate recorder channel. The AND gates which currently receive a binary "0" from the translator remain in a nonconductive state, and they thereby apply a potential representing a binary "0" to the input of their channel of the recorder transport. These two BCD characters are recorded on a single line of tape in the customary manner.

Output 131 from the check circuit 130 is energized whenever the data appearing on the output of gates G0 through G9 does not have the required plausibility in the 2-out-of-5 code form. The potential ON conductor 131 is applied to the inhibit terminal of the clock 123 to stop it and in turn to stop the counter from advancing further. The stopping of the clock prevents the recorder from recording any further information from the transverter for the call to which the currently received data pertains.

The foregoing has described how the first data byte is received from transverter register 103A–0 over bus 102–A, is stored in the operated ones of recorder input relays A0 through A9, and by means of the make contacts of these relays, is extended through gates G0 through G9, to translator 134 and, in turn, presented as BCD information to the recorder transport and placed on tape. Similarly, the information received over the remaining data busses effects the operation of the B–, C–, and D– input relays; it is read out sequentially as the counter advances through its B, C, and D positions; and in a manner identical to that for the first data byte it is scanned or read out by counter 128, passed through the G– gates, translated by the translator 134, applied to the recorder transport, and placed on tape.

After the data represented by the operated D-relays is recorded when the counter is in its D position, the counter advances back through its R and then to its A position. The information on the data busses is again scanned as the counter proceeds to advance once again through its positions A through D. However, as is subsequently described, the steering circuit of each bus advances during the period of time intervening between the consecutive scans of the bus. The advancement of the steering circuit disconnects the bus from the transverter register to which it was initially connected on a first scan and connects it to the next register so that a new pair of data characters are applied to the bus and to the recorder input relays by the time the bus is next scanned when the counter once again steps through its position A through D.

This repeated stepping of the counter and the repeated scanning of the data busses continues until all of the data in the transverter has been received and recorded. At that time, make contacts LCP1 in the connector operate and apply a ground to conductor 124 to inhibit the clock 123 and thereby prevent any further advancement of the counter until the recorder is released by he connector when contacts LCP1 open. Relay CL subsequently releases when the connector releases the recorder. At that time the break contacts of relay CL extend the terminal 125 ground to the lower input of AND gate 136. When the counter steps to its position R, a ground is applied to the other input terminal of gate 136. This causes the gate to inhibit the clock 123 until the recorder is subsequently seized on another call usage.

The following paragraphs describe the operation of the circuitry shown on FIGS. 1B and 1D and, in particular, they describe how the advancement of the steering circuit of each bus is initiated as soon as the bus is scanned, and further, how the recorder control circuit determines when all of the data has been received from the transverter.

The relay windings of the transverter steering circuit are shown on FIG. 1B. The circuitry within the recorder that controls the advancement of the steering relays is shown on FIG. 1D. Just as the individual transverter registers on FIG. 1A are arranged in a column-by-column manner, so are the controlling relay windings on FIG. 1B with (preceding from left to right) the first, second, third and fourth columns of registers on FIG. 1A being functionally associated with the first, second, third and fourth column of relays on FIG. 1B. The left-most column of relays on FIG. 1B comprises relays AR1 through AR3 together with relays AR1A through AR3A. Relays AR1 through AR3 control the like designated contacts connected to the left-most column of registers on FIG. 1A. Relays BR1 through BR3 of the second column on FIG. 1B are associated with the like designated contacts of FIG. 1A. The same relationship exists between the relays of the third and fourth columns on FIG. 1B and the contacts serving the third and fourth columns of registers on FIG. 1A.

Elements 140–A through 140–D on FIG. 1D control the advancement of the transverter steering relays. Each such element is individual to one column of steering relays of FIG. 1B. The details of element 140–A are shown while elements 140–B through 140–C are represented only diagrammatically with their details being identical to that of element 140–A. Each control element operates under control of the counter to generate the signals required to advance the steering relays of its associated column on FIG. 1B.

The input conductors of control elements 140–A through 140–D are designated 142–A through 142–D and they are connected via conductors 122–A through 122–D to counter sections A through D, respectively. It will be recalled that the output of each counter section is normally at a low or negative potential but, is driven to a ground potential during the time the counter is in the position associated with each such section. The ground potential that appears on the output conductor of the section at this time is applied over one of conductors 142– to the input of a control element 140–. The control element responds to the potential and, in turn, applies to its output conductor 141– a potential that initiates the advancement of its column of steering relays one step. Thus, when the counter is in its A position, a ground potential is applied to its output conductor 122–A and over conductor 142–A to element 140–A. Element 140–A, in turn, generates and applies to its output conductor 141–A a potential that is transmitted over conductor 114–CA to advance the left-most column of steering relays one step.

Before proceeding further with the system operation, the detailed circuit operation of control element 140–A is described in the following paragraphs. This element comprises an inverter I, transistors Q1, Q2, and Q3, together with a silicon controlled rectifier SCR. Normally, the SCR and transistors Q1, Q2, and Q3 are all in an OFF or nonconductive state. When the counter advances to its A state, the ground potential on conductor 142–A is inverted by inverter I and extended as a negative potential through resistor R1 to the base of transistor Q1. This potential forward biases the base-emitter junction of the transistor, turns it on, and drives the collector of the transistor from a negative to a positive potential. This positive potential is applied through resistor R3 to the T (trigger) input of the SCR to cause it to fire and conduct independently of the potential subsequently appearing on its T conductor. The path over which the SCR first fires and conducts at this time following the seizure of the recorder and the beginning of scanning may be traced as follows: ground on terminal 144–1 on FIG. 1B, make contacts of relay ON, through the winding of relay AR1, through break contacts AR1, terminal 145–1, over conductor 114–CA, through make contacts 112–A within the connector, over conductor 114–A, through resistor R11, from the anode of the SCR to its cathode, through resistors R5 and R6 in series to the source of regative 48 volt potential. The ON relay contacts in the aforementioned path are controlled by the winding of the off normal relay ON which is in a released state whenever the transverter is idle but is operated whenever the transverter is seized on a call usage. The circuit path for the ON relay winding is shown only diagrammatically on FIG. 1B since OFF-normal type relays and relay circuits are well known.

The SCR's path to ground within the transverter is promptly opened as soon as relay AR1 operates and opens its break contacts at terminal 147–1. Since the operate time of relay AR1 is in the order of milliseconds, the SCR conducts only briefly until AR1 operates and then extinguishes. This brief current through resistors R5 and R6 in control element 140–A does not alter the potential on capacitors C2 and, therefore, the conductive state of transistor Q2 and, in turn Q3 is unaltered by this brief conduction period of the SCR.

Subsequently, at the time the last data byte on its bus is scanned, the SCR conducts continuously and, in so doing, the IR drop across resistor R5 forward biases the base-emitter junction of transistor Q2 to turn it ON. This causes the collector of the transistor to assume a negative potential which is extended through resistor R9 to forward bias the base-emitter junction of transistor Q3 to turn it ON so that a ground potential is then applied over output conductor 143–A to the input of gate 146. The function of this output potential and of gate 146 is subsequently described in detail.

As already mentioned, relay AR1 operates from when the SCR of control element 140–A first fires and conducts momentarily following the interconnection of the transverter and the recorder. The operation of relay AR1 operates its transfer contact common to terminal 147–1 on FIG. 1B. This set of transfer contacts is of the "make before break" type in which the make contacts of the set are closed before the break contacts open. The closing of the make contacts completes an obvious circuit comprising the windings of relays AR1 and AR1A in series between ground and the source of negative 48 volt potential. This path maintains relay AR1 operated and operates relay AR1A. The opening of the break contacts of this set interrupts the conductive path for the SCR and turns it OFF as already mentioned. The closure of the make contacts AR1A connected to terminal 145–1 effectively extends conductor 114–CA upwards to terminal 145–2 and to the circuitry associated with relays AR2 and AR2A.

The potential from counter section A that causes the SCR of control element 140–A to fire is of extremely short persistence and, therefore, this potential is removed from conductor 142–A long before relay AR1 or AR1A in the transverter steering circuit has time to operate. Therefore, transistor Q1 is in an OFF state and the trigger input of the SCR is returned to a negative potential prior to the time that relay AR1A operates and effectively extends the anode circuit of the SCR from terminal 145–1 to 145–2.

The relative speeds of operation of the counter and the transverter steering circuit relays are such that the operation of relay AR1, for example, is not completed while the counter is still in its A position. Instead, the relay may not be fully operated until the counter is advanced through its B and possibly into its C or D position. The only requirement regarding the speed of operation of a steering relay, such as AR1, is that it be fully operated and its contact chatter terminated before the counter advances to its A position for a second scan.

The transfer contacts AR1 common to terminal 148–1 on FIG. 1A operate and transfer the conductors of cable 102–A from register 103A–0 to register 103A–1 when relay AR1 operates. The four operated recorder relays in the group A0 to A9 release at this time. Immediately upon the transfer, four relays in the same group are operated under control of the information in register 103A–1 to which the conductors of the bus are now connected.

The preceding paragraphs have described how control element 140–A responds to the output potential from section A of the counter and, in so doing, how it fires its SCR and causes the left-most column of steering relays on FIG. 1B to advance one step. This advancement in turn transfers the conductors of cable 102–A from the top register to the next register down in the left-hand column of FIG. 1A. In a similar manner, control elements 140–B through 140–D respond to the output potential from the B, C, and D sections of the counter, respectively; they fire the SCR therewithin; and they cause their steering circuits on FIG. 1D and their contacts on FIG. 1A to advance one step.

When the counter first steps out of its R position and through its operative position A through D, the SCR in each control element 140–A through 140–D fires and momentarily conducts for the time required to initiate the advancement of the associated steering circuit one position. Each SCR then turns OFF. After the counter has scanned the information in the right-most register of the top row, i.e., register 103D–0, and has then advanced from its D position through position R and then back to its A position, relay AR1 is held operated by a series circuit comprising the winding of its auxiliary relay AR1A. Also, at the same time, the first steering relay on each of the remaining columns of FIG. 1B has either operated or is in the process of operating and completing a locking path for itself through its auxiliary relay. The precise number of steering relays that are operated by the time the counter returns to its position A for a second scan depends upon the relative speed of the counter and the operate time of the relays. In this respect, the primary requirement is that relay AR1 be fully operated and locked in series with its auxiliary relay by the time the counter returns to its A position. Similarly as the counter advances through its positions B, C, and D for a second scan, it is required that the first or lower relay of each column on FIG. 1B be fully operated and locked in series with its auxiliary relay by the time the counter reaches the operative position associated with the column. In other words, by the time the counter advances to its position B for a second scan, the relay BR1 must be operated.

As a consequence of the operation of the steering relays and the advancement of the counter, each of cables 102–A through 102–D is disconnected by the steering circuit contacts from registers 103A–0 through 103D–0 and connected to the next register in each column by the time the scanner steps through its positions A through D on a second scan. The data from the registers of the second row is thereby now applied to the busses to operate the recorder input relays in combinational code form. This data is scanned in a column by column manner in the same manner as already described, is applied to the translator, and recorded as the counter steps for the second time through its positions A through D.

The SCR of each control element is fired and the advancement of the steering relay of each column on FIG. 1B is initiated as the counter steps through its second cycle. Upon the completion of the second scan and immediately prior to the initiation of the third scan, relays AR1 and AR2 of the left-most column will be fully operated. At the same time, the operation of the second relay of each of the B, C, and D columns will be in various states of completion depending upon the relative speed of operation of the counter and the relays. In this connection, the operation of BR2 should be almost fully completed while the operation of relays CR2 and DR2 will be less fully completed. The operation of relay AR2 disconnects cable 102–A from the second register and transfers it to the third register of the first column. Contacts BR2, CR2 and DR2 perform the same function when their relays subsequently operate.

When counter 128 advances through its third cycle, it causes the data on the busses 102–A through 102–D to be scanned sequentially and, at the same time, it transmits the signals to the control elements of FIG. 1D to initiate the advancement of the steering circuit for each bus. Relays AR3, BR3 and CR3 operate and lock under the control of their auxiliary relays following the third scan of their busses. The operation of these relays disconnects the first, second and third data busses from the third row of registers and connects them to the registers of the fourth or bottom row in preparation for the last scan.

When the fourth bus, bus 102–D, is scanned for the third time, control element 140–D transmits a positive potential to the steering relays of its column in FIG. 1B when its SCR fires. The path for this potential includes conductor 141–D, connector contacts 112–D, conductor 114–CD within the transverter, terminal 149–1, make contacts DR1A, break contacts MU, make contacts DR2A, to terminal 149–3. From there, the path may be further extended through make contacts MUD to terminal 149–4, through break contacts BLD and resistor B1 in parallel, the winding of relay BLD, make contacts of relay ON, to ground on terminal 150–9. Relay BLD operates over this path and opens its break contacts. The current through resistor B1 is sufficient to maintain relay BLD operated in series with the SCR within control element 140–D. This path maintains the SCR in an ON state. The continued conduction of the SCR turns on its Q2 and Q3 transistors. The turn on of its Q3 transistor switches its output conductor 143–D from a negative to a ground potential. This ground extends over conductor 143–D to an input of gate 146.

The SCR within control element 140–A fires as cable 102–A is scanned for the fourth time. The path within the transverter over which the SCR fires includes conductor 114–CA, make contacts of relays AR1A, AR2A, and AR3A in series, to terminal 145–6. From there the path continues through resistor LDA and make contacts of relay ON to ground on terminal 145–5. This path maintains the SCR of element 140–A in an ON state, causes its transistors Q2 and Q3 to turn ON, and switches the potential on output conductor 143–A from a negative to a ground potential extending to an input of AND gate 146.

When cable 102–B is scanned for the fourth time, the SCR within control element 140–B fires and is held in an ON state by its steering circuit within the transverter to ground on terminal 145–7 in series with resistor LDB and make contacts relay ON. The continued conduction of the SCR within this control element causes its output conductor 143–B extending to AND gate 146 to be grounded.

With reference to FIG. 1A, it may be seen that the scanning of cable 102–B at this time makes available to the recorder the next to the last pair of characters that are currently in the transverter. The C register of the bottom row obviously contains the last pair. The data in the last register is transmitted to the recorder when the counter 128 steps into its position C for the fourth time. At the same time the information on cable 102–C is being scanned, the SCR of control element 140–C fires and is held ON from the ground supplied by its steering circuit on FIG. 1B. This path to ground may be traced through make contacts of relay CR1A, CR2A, and CR3A in series to terminal 150–4 which is common to the transfer contacts of relay MUD. This relay is currently operated since it has been assumed that the currently describing circuit operations are for an MUD type entry. Therefore, the ground on terminal 150–4 may be extended through the make contacts MUD, through the make contacts of relay BLD which is operated at this time as already described, through the winding of relay LCP, through make contacts of relay ON to ground on terminal 149–9. Relay LCP operates over this path and the ground from terminal 149–9 maintains the SCR of element 140–C in an ON state. This turns ON its transistors Q2 and Q3 and drives the output conductor 143–C low extending to AND gate 146.

AND gate 146 on FIG. 1D is of the inverting type and its mode of operation is such that its output is at a low or ground potential at any time when one or more of its inputs are in an ungrounded or high negative potential state. Thus when transistor Q3 of element 140–A is OFF, conductor 143–A extending to one input of AND gate 146 is held at a negative potential and by itself holds the output of the gate at a low potential to represent the non-AND state of the gate. Conversely, the AND condition of the gate occurs when all of its input conductors are concurrently at a low or ground potential. The output of the gate 146 goes negative when the gate turns ON during its AND condition. This negative potential is extended to the base of transistor Q4 to turn it ON when gate 146 assumes its AND state. In other words, the state of transistor Q4 follows that of the AND gate in that the transistor is OFF or in a nonconductive state when the gate is in its non-AND condition. The transistor turns ON when the gate assumes its AND state. The input conductors of the gate include the four conductors 143–A through 140–D extending from control elements 140–A through 140–D, respectively. The fifth input conductor of the gate comprises conductor LCP which extends from the transverter circuit in series with contacts LCP1 in the connector. It will be recalled that relay LCP in the transverter operates when the final pair of data characters are transmitted to the recorder. The winding of connector relay LCP1 is connected at terminal 149–6 in the transverter to the same circuit path that caused relay LCP to operate. Therefore, relay LCP1 operates at the same time as does relay LCP and in parallel with it. The operation of relay LCP1 closes its make contacts to extend the ground on terminal 150 in the transverter through make contacts LCP, over conductor LCP, through make contacts LCP1 in the connector, over conductor LCP on FIG. 1D, to the lower input of AND gate 146. This ground together with the grounds on its other inputs turns gate 146 OFF and causes its output to go high to represent the AND state of the gate. This high turns ON transistor Q4 which is connected over conductor RLS and make contact LCP1 in the connector to relay RLS in the transverter. Relay RLS operates at this time to indicate to the transverter that the recorder has received all of the data from the transverter. The control circuitry of the transverter then takes the further appropriate action required to cause the connector relays to release and break down the interconnection between the transverter and the recorder.

With respect to the foregoing described circuit operation, the functions of relays BLD and LCP on FIG. 1 may be better understood from the following description. Relay LCP operates at the time the last pair of data characters is transmitted to the recorder. The closure of the make contacts of this relay transmits the necessary signals to the recorder over conductor LCP to advise it that the last pair of data characters has been transmited. Relay BLD operates when the third from the last pair of data characters are scanned by the recorder. Specifically on the MUD type of entry described, the BLD relay operates at the time the right-most register in the third row from the top, i.e., register 103D–2 is scanned. Prior to the scanning of this register, the four steering control conductors, 112–A through 112–D, provided only an intermittent ground so that each SCR conducted only momentarily, advanced its steering circuit, and then turned OFF as the ground potential on its control conductor is broken when a relay in its steering circuit operates. The SCR's conduct momentarily and turn OFF in this manner as each register is scanned up to, but not including the scanning of register 103D–2. At that time, the ground on conductor 114–CD is not interrupted but instead, is continuously maintained on the conductor via the winding of relay BLD. The SCR in control element 140–D remains in an ON state and grounds its output conductor 143–D extending to AND gate 146.

Following the scanning of register 103D–2, and as registers 103A–3, and 103B–3 are then scanned, the steering circuit applies a steady ground to control conductors 114–CA and 114–CB to maintain the SCR's in control elements 140–A and 140–B in an ON state. Finally, when the last register is scanned, register 103C–3, relay LCP operates and provides a steady ground to hold the SCR of control element 140–C ON. This signifies the end of the data transmission and effects the release of the transverter in the manner already described.

The sequence of circuit operations associated with TS and MU entries is analogous to that already described in that intermittent ground are initially applied to the steering circuit control conductors so that initially the SCR's fire and then promptly turn OFF. Subsequently, the contacts of relays TS or MU, depending upon the type of entry, interconnect a steering circuit control conductor with the BLD relay so that the winding of this relay provides a steady ground to the control conductor as the third from the last set of data of characters is being scanned. The contacts of the TS or MU relays further alter the state of the steering circuit of FIG. 1B so that a steady ground is provided on the two control conductors associated with the next two sets of data characters that are scanned. Finally, the contacts of the TS or MU relays alter the state of the steering circuit so that the LCP relay operates as the last register containing data is scanned. The operaion of relay LCP affects the release of the transverter.

The following briefly describes the sequence of operations within the steering circuit for the MU and TS type of entry. The MU entry is described first since it contains the least amount of data; specifically, on this entry, ten sets of data characters are transmitted from the first ten registers, i.e., the four registers in each of the top two rows together with the two left-most registers in the third row.

Steering relays AR1 through DR1 operate and lock in series with their auxiliary relays as the top row of registers is scanned sequentially beginning with register 103A–0. When the first two registers of the second row are scanned, relays AR2 and BR2 operate and lock in series with their auxiliary relays. Next, as the third or C register of the second row is scanned, the SCR within control element 140–C is held ON from the ground applied to control conductor 114–C extending from the transverter over the following path: transverter conductor 114–C, make contacts relay CR1A, terminal 150–2, make contacts of relay MU operated, terminal 149–4, through the break contacts of relay BLD and the winding of the relay via make contacts ON to ground on terminal 150–9 Relay BLD operates over this path.

As register 103D–1 is scanned following the operation of relay BLD, a steady ground to hold ON the SCR of control element 140–D is provided by the transverter as follows: control conductor 140–CD, make contacts of relay DR1A, make contacts of relay MU, through resistor LDD to ground on make contacts of relay ON and terminal 149–7.

Next, as cable 102A and register 103A–2 are scanned, the steering circuit provides a continuous ground on conductor 114–CA over the following path: make contacts of relay AR1A and AR2A in series to terminal 145–4, make contacts of relay MU to terminal 145–6, resistance LDA and the make contacts ON to ground on terminal 145–5. This path maintains ON the SCR in control element 140–A.

When the last register is scanned, i.e., register 103B–2, the contacts of the MU relay connected to terminal 151–3 in the B column of relays on FIG. 1B, connect relay LCP to that circuit so that the relay winding provides a steady ground for the SCR of control element 140B. The relay operates as the SCR fires and the SCR continues to conduct by virtue of the steady ground provided by the relay. The operation of this relay initiates the release of the transverter as priorly described.

The following briefly describes the sequence of operations within the steering circuit for a TS type entry. The first two rows of registers are scanned in the conventional manner and steering relays AR1 through DR1 and AR2 through DR2 operate and lock in series with their auxiliary relays. Relays AR3 and BR3 also operate and lock when the first two registers of the third row are scanned. Next, as the C register of the third row is scanned, the make contacts of relay TS connected to terminal 150–5 extend the circuit to terminal 149–4 and relay BLD so that a continuous ground is provided to conductor 114–CC via the winding of relay BLD. This relay operates and maintains conduction within the SCR of control element 140–C.

As the D register of the third row is scanned, a steady ground is applied to control conductor 114–CD via make contacts or relays DR1A, break contacts of relay MU, make contacts DR2A, break contacts of relay MUD, resistance LDD to ground via the make contacts of relay ON and terminal 149–7. This path holds ON the SCR for control element 140–D. Next, as the first register of the fourth row is scanned, a steady ground is appled to control conductor 114–CA via make contacts AR1A, AR2A, break contacts MU, make contacts AR3A, to ground via resistor LDA and the make contacts of relay ON. This path maintains in an ON state the SCR for the control element 140–A. Finally, when the B register of the bottom row is scanned, the make contacts of relay TS at terminal 151–4 connect the operate path for relay LCP to control conductor 114–CB so that the relay now operates, maintains conduction within the SCR for control element 140–B, and initiates the release of the transverter in a manner similar to that described for the other two types of entries.

It may be seen from the foregoing that the steering and control circuit provided in accordance with our invention is advantageous in that it enables data to be transmitted via the contacts of a relay steering circuit faster than has been obtainable heretofore. It is further advantageous in that it provides a simple, uncomplicated, but yet an efficient and reliable method of indicating when all of the data currently available within the transverter has been transmitted and made available to the recorder.

It is to be understood that the above-described arrangements are merely illustrative of the numerous and varied arrangements that may constitute applications of the principles of our invention.

What is claimed is:

1. In a system for transmitting data over a plurality of busses from registers within a first circuit to receiving equipment in a second circuit, a multiposition steering circuit for each bus for connecting individual ones of said registers to its bus in sequence one register at a time, means in said second circuit for repeatedly reading the data on said busses sequentially bus-by-bus, and means effective subsequent to each reading of a bus for advancing its steering circuit to its next operative position during the time data is being read from the others of said busses.

2. The system of claim 1 in combination with means for providing an indication to said second circuit when the last of the data currently stored in the registers of said first circuit has been applied to said busses.

3. The system of claim 2 in which said last-mentioned means comprises a plurality of control conductors interconnecting said first and second circuits with each conductor being individual to a different one of said busses, and means in said first circuit for applying an end of data signal to all of said control conductors when all of the data currently stored in said registers has been applied to said busses.

4. The invention of claim 1 in combination with a plurality of control conductors interconnecting said first and second circuits with each conductor being individual to a different one of said busses as well as to the steering circuit of the bus to which it is individual, means in said first circuit for normally connecting a ground potential to the control conductor for each bus, means responsive to each advancement of a steering circuit for momentarily interrupting the ground potential applied to its associated control conductor, means effective as the last of the data applied by said circuit to each bus is read for maintaining a continuous ground potential on the control conductor individual to the bus, and means in said second circuit for detecting the presence of said continuous ground potential on each of said control conductors as an end of data condition.

5. In a system for transmitting data from a first to a second circuit over a plurality of busses, a plurality of groups of registers in said first circuit with each group being individual to a different one of said busses, a multiposition steering circuit for each bus for connecting its bus to the different registers of its group in sequence one register at a time, means in each register for applying data signals to its bus when it is connected thereto by its steering circuit, means in said second circuit for repeatedly scanning said busses sequentially one bus at a time, means responsive to each scan of a bus for reading the data stored in the register to which the bus is currently connected, and means controlled by said scanning means for advancing the steering circuit of each bus to its next operative position during the time the others of said busses are being scanned.

6. The system of claim 5 in which said last named means comprises, means effective during each scan of a bus for initiating the advancement of its steering circuit, and means responsive to said initiation for completing the advancement of said steering circuit during the time that others of said busses are being scanned and prior to the next scan of its bus.

7. The system of claim 5 in combination with means responsive to the advancement of said steering circuits for providing an indication to said second circuit when all of the data currently in the registers of said first circuit has been applied to said busses.

8. The system of claim 7 in which said last-named means comprises a plurality of control conductors interconnecting said first and said circuits with each conductor being individual to a different one of said busses, means for applying an end of data signal to each control conductor when its bus is connected to the last register of its group currently containing data, and means in said second circuit for generating an output potential when said end of data signal is concurrently applied to all of said control conductors.

9. The invention of claim 5 in which said scanning means comprises, a counter having an operative position individual to each of said busses, data receiving means common to all of said busses, means for repeatedly advancing said counter through its operative positions, means effective as said counter is in any of its positions individual to a bus for scanning the data currently applied to said bus, and means responsive to each scan of a bus for applying the data currently thereon to said data receiving means.

10. The system of claim 9 in which said steering circuit advancing means comprises a plurality of control conductors interconnecting said first and second circuits with each conductor being individual to a different one of said busses, a plurality of control elements in said second circuit each of which is individual to a different one of said control conductors, means effective when said counter is in each of its positions individual to a bus for extending a scanning potential from the current counter position to the control element individual to the bus being scanned, and means in each of said control elements responsive to the reception of said scanning potential for applying a control potential to its control conductor for the time required to advance its associated steering circuit to its next operative position, and switch means in each of said control elements for removing said control potential upon the completion of the advancement of its steering circuit.

11. The invention of claim 5 in combination with, a plurality of control conductors interconnecting said first and second circuits with each conductor being individual to a different one of said busses as well as to the steering circuit for the bus to which it is individual, a plurality of relays in each of said steering circuits with each relay being individual to one position of its steering circuit, means for connecting the winding of the relay for the current position of each steering circuit between ground and the control conductor individual to the steering circuit, means responsive to each advancement of a steering circuit for transferring its control conductor from ground via the winding of the relay individual to the current position to ground via the winding of the relay individual to the next position, and means effective when the last register containing data in each group is connected to its bus for maintaining a continuous ground potential on its control conductor when its bus is scanned to signify an end of data signal for the group of registers associated with the bus.

12. The invention of claim 9 in combination with a plurality of control conductors interconnecting said first and second circuits with each conductor being individual to a different one of said busses as well as to the steering circuit for the bus to which it is individual, a plurality of relays in each of said steering circuits with each relay being individual to one position of its steering circuit, a plurality of control elements in said second circuit each of which is individual to a different one of said control conductors, means for extending said scanning potential from each section of said counter to the control element individual to the bus being scanned, a normally off switch in each control element, means responsive to each reception of a scanning potential by a control element for turning on the normally off switch therein, means responsive to each turn on within a control element for applying a control potential to its associated control conductor to advance its steering circuit, means responsive to each advancement of a steering circuit for transferring the steering circuit control conductor from ground via the winding of the relay for the current position of the steering circuit to ground via the winding of the relay for the next position, means responsive to each transfer for momentarily interrupting the ground applied to the associated control conductor, means responsive to each interruption upon the advancement of a steering circuit for turning off its associated switch means when ground is removed from its associated control conductor, and means effective when the last register containing data in a group is connected to its bus for preventing the turn off of its switch means as the data on its bus is scanned, and means responsive to the continued ON state of said switch means for generating an end of data signal for its bus.

13. In a system for transmitting data from a first to a second circuit over a plurality of multiconductor busses, a plurality of groups of registers in said first circuit with each group being individual to a different one of said busses, a multiposition steering circuit for each bus for sequentially connecting its bus to the different registers of its group one register at a time, means in each register for applying data signals to the conductors of its bus when it is connected thereto by its steering circuit, a plurality of groups of relays in said second circuit with each group being individual to one of said busses and with each relay within a group being individually connected to a different conductor of the bus to which its group is individual, means for operating each relay connected to a bus conductor when a data signal is applied thereto by one of said register, means in said second circuit for repeatedly scanning said relay groups sequentially one group at a time to determine the operated or nonoperated state of each relay, means responsive to each scan of a group for receiving the data represented by the operated relays of the group, and means controlled by said scanning means for advancing the steering circuit of each bus to its next operative position during the time other of said groups are being scanned.

14. The invention of claim 13 in which said scanning means comprises, a counter having an operative position individual to each of said groups, means for repeatedly advancing said counter through its operative positions, and means effective as said counter is in each of its positions individual to one of said groups for effecting a scan of the state of the relays of the group individual to the current counter position.

15. The invention of claim 14 in combination in which receiving means common to all of said groups, and means responsive to each scan of a group for applying to said data receiving means the data represented by the current state of the relay group being scanned.

16. The invention of claim 13 in which said scanning means comprises, a counter having an operative position individual to each of said groups, contacts on each of said relays, conductor means connecting each counter section to the contacts of all relays of its group, a plurality of data receiving means common to all of said groups and equal in number to the number of relays in each of said groups, means for repeatedly advancing said counter through its operative positions, means effective when said counter is in any of its positions individual to a group for extending a scanning potential over one of said conductor means to the contacts of the relays comprising the group individual to the current counter position, and means including the contacts of the operated relays of a group being scanned for extending said scanning potential to the ones of said data receiving means that are connected to the contacts of each operated relay of the group being scanned.

17. The system of claim 14 in which said steering circuit advancing means comprises a plurality of control conductors interconnecting said first and said circuits with each conductor being individual to a different one of said busses, a plurality of control elements in said second circuit each of which is individual to a different one of said control conductors, means for extending said scanning potential from each section of said counter to the control element individual to the bus being scanned, and means in each of said elements responsive to the reception of said scanning potential for applying a control potential to the control conductor of its bus for the time required to advance its associated steering circuit to its next operative position, and means in each of said control elements for removing said control potential upon the completion of the advancement of its steering circuit.

18. The system of claim 17 in which each of said control elements comprise a normally nonconductive silicon controlled rectifier (SCR), a source of control potential, means responsive to the application of said scanning potential to a control element to turn on its SCR, means responsive to said turn on to extend said control potential to the control conductor of its group, means in said steering circuit for normally providing a path to ground for its control conductor, and means responsive to each advancement of said steering circuit for momentarily opening said path and for turning off its associated SCR.

19. The invention of claim 18 in combination with means in each steering circuit effective when the last register of its group containing data is connected to its bus for preventing the turn off of its SCR when its bus is scanned, and means responsive to the continued conduction of each of said SCR's for generating an end of data signal for the registers of its group.

20. The invention of claim 14 in combination with, a plurality of control conductors interconnecting said first and second circuits with each conductor being individual to a different one of said busses as well as to the steering circuit of the bus to which it is individual, a plurality of relays in each steering circuit with each relay being individual to one position of its steering circuit, means for connecting the winding of the relay for the current position of each steering circuit between ground and the control conductor individual to the steering circuit, a plurality of control elements in said second circuit each of which is individual to a different one of said control conductors, means for extending said scanning potential from each section of said counter to the control element individual to the bus being scanned, a normally off switch in each control element, means responsive to each reception of a scanning potential by a control element for turning on the normally off switch therein, means responsive to each turn on within a control element for applying a control potential to its control conductor to advance its steering circuit one position, means responsive to each advancement of each steering circuit for transferring its associated steering circuit control conductor from ground via the winding of the relay of its current position to ground via the winding of the relay of the next position, and means responsive to each transfer as a steering circuit advances for momentarily interrupting the ground applied to its associated control conductor, said interrupting means being effective for turning off said switch when the steering ground is removed from the control conductor.

21. The invention of claim 20 in combination with a second normally off switch in each control element, means for preventing the turn on of said second switch whenever said first switch turns on and conducts for less than a predetermined time, and means responsive to the turn on of said first switch when the last register of its bus containing data has been scanned for turning on said second switch to provide an end of data signal for its associated bus, and means responsive to an end of data signal from all busses for generating a signal indicating that all data in said first circuit has been applied to said busses.

References Cited

UNITED STATES PATENTS

| | | | |
|---|---|---|---|
| 3,266,018 | 8/1966 | Higgins | 340—172.5X |
| 3,296,596 | 1/1967 | Yagusic et al. | 340—172.5 |
| 3,362,013 | 1/1968 | Abramson et al. | 340—147 |
| 3,403,382 | 9/1968 | Frielinghaus et al. | 340—172.5 |
| 3,417,374 | 12/1968 | Pariser | 340—172.5 |
| 3,430,199 | 2/1969 | Amiragoff | 340—147 |
| 3,461,455 | 8/1969 | Luehrmann | 340—147 |

PAUL J. HENON, Primary Examiner

R. F. CHAPURAN, Assistant Examiner